Jan. 9, 1962   B. C. GARDNER ET AL   3,016,501
HIGH FREQUENCY PROBE APPARATUS
Filed July 31, 1957   2 Sheets-Sheet 1
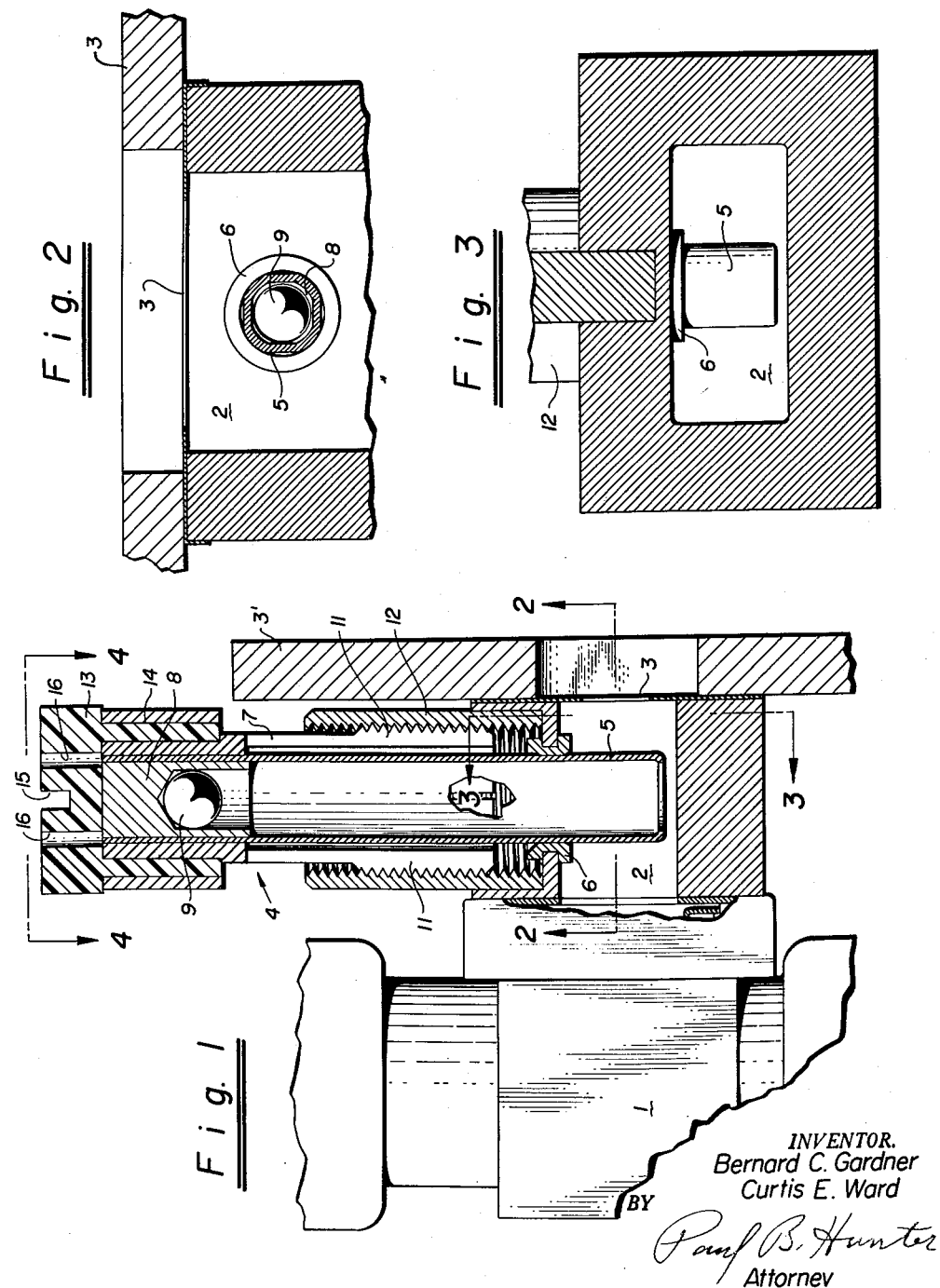
INVENTOR.
Bernard C. Gardner
Curtis E. Ward
BY
Paul B. Hunter
Attorney

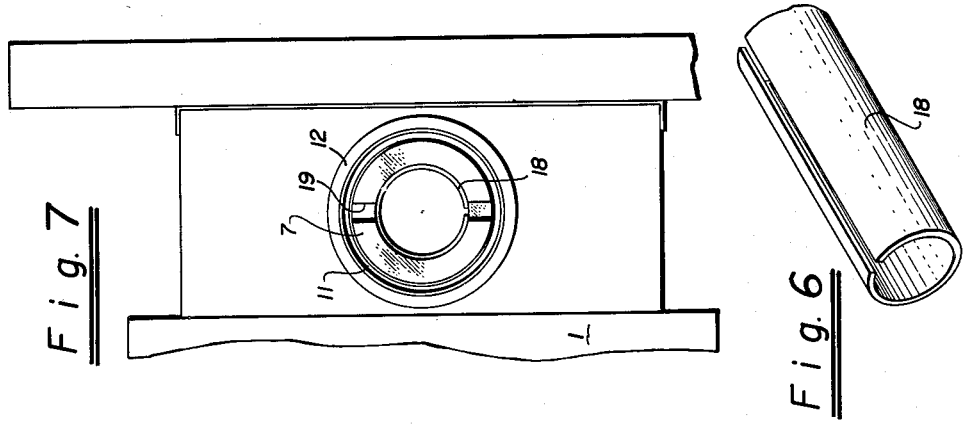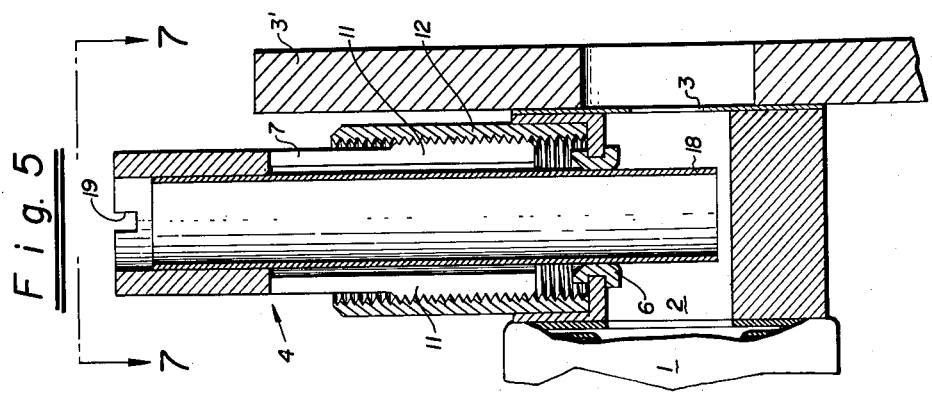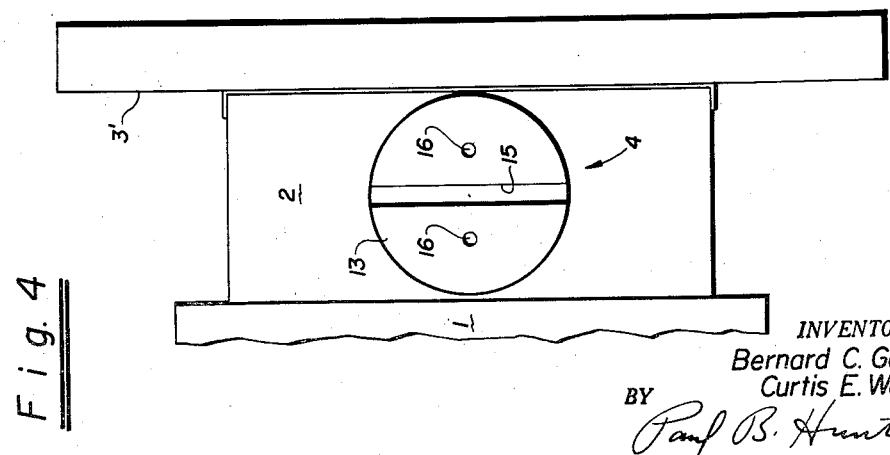
INVENTOR.
Bernard C. Gardner
Curtis E. Ward
BY
Attorney

United States Patent Office 3,016,501
Patented Jan. 9, 1962

3,016,501
HIGH FREQUENCY PROBE APPARATUS
Bernard C. Gardner, Los Altos, and Curtis E. Ward, Palo Alto, Calif., assignors to Varian Associates, Palo Alto, Calif., a corporation of California
Filed July 31, 1957, Ser. No. 675,491
6 Claims. (Cl. 315—5.21)

The present invention relates in general to high frequency probes and more specifically to a novel improved high frequency probe apparatus for varying the impedance of wave propagating structures, tuning cavity resonators and the like.

Heretofore high frequency probe tuners have been utilized for tuning resonant cavities, waveguides and the like. One such prior art high frequency probe includes a radially resilient probe means which is translatable within the wave propagating structure to vary the wave propagating parameters and thus tune the structure, as desired. The probe member is made radially resilient to provide a frictional bearing contact between the probe and the side walls of the propagating structure through which the probe member extends to insure a good radio frequency electrical contact between the probe and the interior walls of the wave propagating structure. Heretofore the radial resilient feature has been provided by longitudinally slotting the probe member to provide the probe with a plurality of radially resilient longitudinal segments, said segments being tensioned outwardly to bear firmly against the side walls of the apertured wave propagating structure. The probe is fixedly secured to a coaxially mounted screw means for producing translation of the probe means within the wave propagating structure, as desired.

Experience with such probe tuners has shown that when the tuning probe is segmented spurious modes of oscillation may at times be produced in the coaxial portion of the tuner structure resulting in narrowing the usable bandwidth of the tuner.

The present invention provides a novel nonsegmented tuning probe which is radially resilient and at the same time avoids the undesired leakage of power and unwanted spurious modes of oscillation whereby extremely broad band tuning may be achieved.

The principal object of the present invention is to provide a novel improved high frequency tuning probe for wave propagating structures having extremely simple design and providing wide tuning bandwidth characteristics.

One feature of the present invention is the provision of a novel nonsegmented radially resilient high frequency tuning probe means whereby unwanted parasitic resonances are avoided and wide band tuning characteristics obtained.

Another feature of the present invention is the provision of a tuning probe of the above featured type wherein the probe member is tubular and formed out-of-round in the transverse dimesion. In addition, the maximum diameter of said probe exceeds the inside diameter of the apertured wall of the wave propagating structure through which the high frequency probe extends whereby a frictional bearing surface is obtained between the probe and the apertured structure to assure good electrical contact therebetween.

Another feature of the present invention is the provision of a novel high frequency probe member wherein the probe member comprises a substantially hollow cylindrical member having a single longitudinal slot therein and wherein the free outside diameter of the probe exceeds the inside diameter of the aperture in the side wall of the wave propagating structure whereby a tight frictional bearing surface is assured between the probe and the structure.

Another feature of the present invention is the provision of novel means for fixedly securing the tuning probe means to a screw means for translating the probe means within the wave propagating structure wherein a member having an outside diameter larger than the inside diameter of the tuning probe member is forced within the tube to extrude the tube and the coaxially positioned screw means in the vicinity of the forced member to produce a tight interference fit between the screw means and the probe means.

Another feature of the present invention is the same as the preceding feature wherein the enlarged member comprises a spherical member having a diameter larger than the inside diameter of the tubular tuning probe.

These and other features and advantages of the present invention will be more apparent after a perusal of the following specification taken in connection with the accompanying drawings wherein:

FIG. 1 is a side elevation view partly in section showing the novel tuner of the present invention, FIG. 2 is a fragmentary cross-sectional view of a portion of the structure of FIG. 1 taken along section line 2—2 in the direction of the arrows, FIG. 3 is a cross-sectional view of the portion of the srtucture of FIG. 1 taken along section line 3—3 in the direction of the arrows, FIG. 4 is a fragmentary plan view of a portion of the structure of FIG. 1 taken along line 4—4 in the direction of the arrows, FIG. 5 is a side elevation view partly in section of a novel tuner of the present invention, FIG. 6 is a perspective view of the tuning probe portion of the structure of FIG. 5, and FIG. 7 is a plan view of a portion of the structure of FIG. 5 taken along section line 7—7 in the direction of the arrows.

Referring now to FIGS. 1 through 4 there is shown the novel tuner of the present invention as utilized for tuning the external cavity of a reflex klystron tube. Although the invention will be explained as utilized for tuning a cavity resonator it is equally applicable in general to tuning probes for use in wave propagating structures. A reflux klystron 1 which is only partially shown has the internal cavity resonator thereof closely coupled to an external rectangular cavity 2. The external cavity 2 is provided with an aperture 3 at the end thereof which is remote from the tube and serves as a coupling iris for coupling energy outwardly thereof via a waveguide mounting flange 3' to a load, not shown. The external cavity 2 is provided with a translatable tuning probe assembly 4 for tuning the external cavity in a manner which is well-known in the art and thereby varying the frequency of the reflex klystron 1, as desired.

The tuning assembly 4 includes a thin walled tubular tuning probe 5 which is made of a resilient material as of, for example, beryllium copper, or cupro-nickel alloy. The thin walled resilient tubular probe 5 is formed out-of-round in the transverse dimension to provide four planar surfaces or flat faces thereon disposed at substantially 90° intervals around the circumference of the probe 5 and thereby causing the flat faces to be circumferentially spaced apart by alternate curved portions. (See FIG. 2.)

The tubular tuning probe 5 extends into the external cavity 2 through an aperture in the side wall thereof. A hollow cylindrical tuner bearing 6 lines the interior surface of the apertured side wall and is crimped in position thereon. The tuner bearing 6 is provided with a flared opening at the outside end thereof to facilitate entry of the tubular tuning probe 5. The tuner bearing 6 is substantially cylindrical and is made of a good wear resistant material as of, for example, Phosphor bronze. The inside diameter of the cylindrical tuner bearing 6 is slightly less than the maximum outside diameter of the tubular tuner probe 5 such that as the tubular tuner probe 5 is inserted within the tuner bearing 6 the out-of-round probe will be forced to conform to the cylindrical configuration of the tuner bearing producing circumferential restrictions of the probe 5 at relatively localized lengthwise portions in the regions thereof where the curved corner portions of the out-of-round probe engage bearing 6 to thereby provide a good frictional bearing between the tuner bearing 6 and the tubular probe due to the resilience of the probe 5. The innermost end of the tubular probe 5 is slightly rounded to strengthen the thin walled probe against torsional deformation and, in addition, to prevent scoring of the tuner bearing 6 upon entry of the tubular probe 5 therewithin during assembly.

The tubular tuning probe 5 is fixedly secured coaxially of a hollow cylindrical tuner screw 7 for effecting rectilinear translation of the probe 5 within the cavity 2. The hollow cylindrical tuner screw 7 has its inside diameter substantially of the same dimensions as the outside diameter of the tubular tuner probe 5, which is cylindrical near the outer end thereof. A substantially cylindrical tuner insert 8 as of, for example, steel, has a hollow cylindrical portion therewithin and is inserted within the hollow tuning probe 5 at the outward extremity thereof. A spherical member 9 such as, for example, a steel ball bearing has an outside diameter slightly greater than the inside diameter of the hollow cylindrical portion of the tuner insert 8 and is forced into position within the hollow cylindrical portion of insert 8. When the enlarged spherical ball 9 is in position within the insert 8 it extrudes outwardly the side walls of the insert 8 and tubular probe 5 producing a tight interference fit between the hollow cylindrical tuner screw 7 and tubular probe 5 thereby fixedly securing the probe 5 to the tuner screw 7. Utilizing the foregoing method of construction of the tuner subassembly it has been found that a high precision subassembly is produced without the necessity of brazing the tuner screw 7 to the R.F. probe 5.

The tuner screw 7 is provided with four longitudinal slots therein at the innermost end thereof thereby dividing the screw into four longitudinal resilient segments 11. The outside surface of the cylindrical tuning screw 7 at the innermost end thereof is threaded to mate with similar threads on the inside diameter of a hollow cylindrical tuner mounting sleeve 12 which is fixedly secured to the side wall of the cavity 2. The side wall of cavity 2 is provided with an enlarged bore extending part way into the wall thereof thereby providing a cylindrical recess for receiving the tuner mounting sleeve 12. The tuner mounting sleeve 12 is fixedly secured to the cavity 2 as by brazing.

An insulating cap 13 as of, for example, nylon is fixedly secured to the outermost extremity of the tuner assembly 4. More specifically, the tuner cap 13 is provided with a cylindrical longitudinal bore therein for coaxially mounting upon the extremities of the tuner probe 5 and tuner screw 7. The tuner cap 13 is secured to the aforementioned members via a suitable cement between the abutting surfaces thereof. In addition, a compression ring 14 as of, for example, spring steel is disposed coaxially of the insulator cap 13 and tuner screw 7 to assure a good bond between the cement and the abutting members. The insulating cap 13 is provided with a transverse slot therein at the free end portion thereof for receiving a screw driver or the like to effect tuning of the cavity by rotation of the tuner screw 7. In addition, two longitudinal bores 16 are provided in the cap to permit the escape of trapped gases between the abutting surfaces of the insulator cap 13 and members 7, 8 and 5 during assembly.

In operation, tuning of the cavity resonator 2 is achieved by producing rotation of the tuner screw 7 through the intermediary of a screw driver or the like coupled to the insulator cap 13. Rotation of tuner screw 7 produces rectilinear translation of the screw within the tuner mounting sleeve 12 thereby producing rectilinear translation of the tuning probe 5 within the cavity resonator 2 to change the electrical characteristics of the cavity and vary the resonant frequency thereof, as desired.

The tuning probe 5 is locked in position at any particular setting via a frictional bearing lock produced by the frictional force exerted between the outwardly tensioned threaded segments 11 of the tuner screw 7 and the tuner mounting sleeve 12. In addition, further frictional locking is produced at the bearing surface between the tuner bearing 6 and the radially resilient tuner probe 5.

Referring now to FIGS. 5, 6 and 7 there is shown another embodiment of the present invention. This embodiment is substantially identical to the embodiment of FIGS. 1 through 4 with the exception of the physical configuration of the tubular turning probe and the manner in which the tuning probe is secured to the tuning screw. More specifically, the tuner probe 18 comprises a length of hollow cylindrical tubing provided with a single longitudinal slot therein forming a C-type spring member. The free outside diameter of the probe 18 is made slightly larger than the inside diameter of the tuner bearing 6 whereby a tight frictional bearing surface is obtained between the cylindrical bearing 6 and the probe 18 when the probe is inserted within the bearing 6. The tubular probe 18 is fixed in a coaxial manner within the interior bore of the hollow cylindrical tuner screw 7 as by brazing at the outer extremity of the tubular probe 18 and the tuner screw 7. As in FIG. 1 the tuner screw is provided with four longitudinal slots therein dividing the cylindrical screw member into a plurality of spring-like fingers which threadably mate with the tuner mounting sleeve 12. The tuner screw 7 overhangs the outward extremity of the tubular probe 18 and is provided with a transverse slot 19 for receiving therewithin a screw driver or the like for effecting rotation thereof.

The tuner assembly of FIGS. 5, 6 and 7 operates substantially identically to the operation of the tuner assembly of FIGS. 1, 2, 3 and 4. Tuning assemblies constructed according to the teachings of the aforementioned embodiments provide an extremely broad band tuner which is substantially nonmicrophonic and, because of the frictional locking means, requires no locking nut or the like to assure fixed tuning.

Due to the unsegmented nature of the tuning probe of the present invention substantially no R.F. energy is propagated past the probe to the coaxial spaces between the R.F. tuning probe 5 or 18 as the case may be and the coaxial tuning screw means 12. Since R.F. energy cannot leak into these coaxial spaces, no undesired resonant modes are produced therein which will seriously and deleteriously effect the tuning range of the tuning probe, as encountered at times with prior art segmented tuners.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A microwave tuning apparatus for hollow microwave propagating structures including, a hollow wave propagating structure for propagating microwaves within the hollow interior thereof, a microwave tuning probe transversely extending into the interior of said hollow wave propagating wave structure through an aperture in a side wall of said wave propagating structure to effect tuning of said wave propagating structure, said tuning probe including an elongated hollow tubular probe member having alternate flat and curved portions, said tuning probe member curved portions bearing in tight slideable engagement with the inside peripheral surface of the aperture in said hollow wave propagating structure to produce circumferential restrictions of said tubular tuning probe member at relatively localized lengthwise portions of said tuning probe member in regions where said probe member curved portions engage the aforementioned aperture in said hollow wave propogating structure thereby producing a relatively high frictional unit load on said tuning probe member at said regions of bearing engagement whereby enhanced R.F. contact is assured between said tuning probe member and said wave propagating structure, and means coupled to said tuning probe for producing rectilinear translation of said probe within said wave propagating structure for tuning as desired.

2. The apparatus according to claim 1 wherein said probe member comprises four substantially planar faces thereon disposed at substantially 90° intervals around the circumference of said probe member.

3. The apparatus according to claim 1 wherein said means coupled to said tuning probe for effecting rectilinear translations thereof includes a hollow cylindrical screw coaxially mounted externally of said tuning probe member, and means coupling together said probe member and said screw means including a hard spherical ball forced within the interior of said hollow tubular probe member for outwardly extruding said probe member against the inner surface of said hollow cylindrical screw means to produce a tight interference bond between said probe member and said translation effecting means.

4. The apparatus according to claim 1 wherein said means coupled to said tuning probe for producing rectilinear translation of said probe includes means for imparting torsional and longitudinal forces to said hollow tubular tuning probe member for advancing and retracting said probe within said wave propagating structure.

5. A microwave tuning apparatus for varying the electrical parameters of a wave propagating structure comprising; a thin walled tubular tuning probe member having a substantially cylindrical inner bore and adapted for translation within said wave propagating structure; a hollow cylindrical screw means coaxially mounted externally of said probe member and coupled to said probe for effecting translation of said probe member within said wave propagating structure; coupling means for coupling said probe member to said translating effecting screw means including a hollow cylindrical insert means carried within said tubular probe member, a hard spherical ball having dimensions larger than the interior dimensions of said cylindrical insert means and forced within the hollow cylindrical portion of said insert means for extruding the walls of said insert means and said probe member outwardly against the inside wall of said translation effecting screw means whereby said probe member, said translation effecting screw means and said spherical ball member are firmly coupled together by a tight interference bond therebetween.

6. The apparatus according to claim 1 including, a reflex klystron tube having an internal cavity resonator coupled to said hollow wave propagating structure, said tuneable hollow wave propagating structure serving as a tuning cavity for tuning said reflux tube.

References Cited in the file of this patent

UNITED STATES PATENTS

| 608,178 | Cock | Aug. 2, 1898 |
| 2,572,232 | Wolfe | Oct. 23, 1951 |
| 2,824,258 | Snow | Feb. 18, 1958 |

FOREIGN PATENTS

| 44,231 | France | Sept. 10, 1934 |
| | (Addition) | |
| 70,655 | Norway | July 8, 1946 |
| 261,741 | Switzerland | Sept. 1, 1949 |
| 1,113,059 | France | Nov. 23, 1955 |